Sept. 2, 1924.  
C. A. M. WEBER  
THRUST BEARING  
Filed Feb. 15, 1919  
1,506,796

WITNESSES:  
H. J. Shelhamer  
F. A. Lind

INVENTOR  
Clifford A. M. Weber  
BY  
Wesley G. Carr  
ATTORNEY

Patented Sept. 2, 1924.

1,506,796

UNITED STATES PATENT OFFICE.

CLIFFORD A. M. WEBER, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

THRUST BEARING.

Application filed February 15, 1919. Serial No. 277,310.

*To all whom it may concern:*

Be it known that I, CLIFFORD A. M. WEBER, a citizen of the United States, and a resident of Edgewood Park, in the county of Allegheny and State of Pennsylvania, have invented a new and useful Improvement in Thrust Bearings, of which the following is a specification.

My invention relates to bearings and it has particular relation to devices of this character for use on machines in which longitudinal thrusts are exerted on the shafts, such, for example, as fans or machines having worm-threaded shafts.

The object of my invention is to provide a device of the character designated that shall be simple and inexpensive to manufacture, strong and durable in operation and which will require a minimum number of parts.

Figure 1:
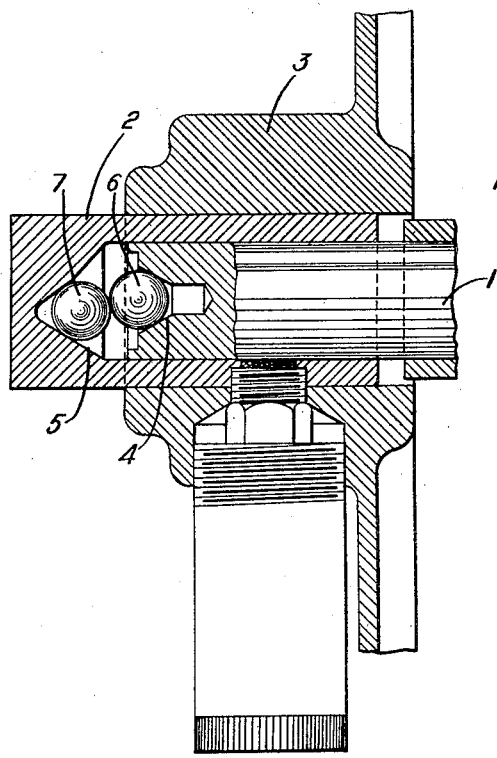
Figure 2:
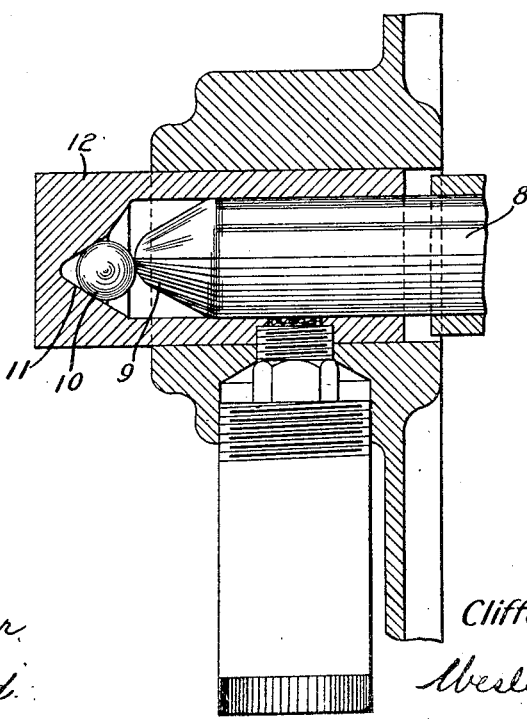

In the accompanying drawings, Fig. 1 is a sectional view of a machine bearing embodying my invention, and Fig. 2 is a similar view of a modification thereof.

A thrust bearing of usual construction has a ball mounted in the end of the shaft or journal and another coacting ball mounted in the journal box, both of the balls being in alinement with the shaft so that, although the balls move within their sockets, nevertheless, flat spots are worn on the balls where they engage each other and conical zones are worn where they engage the sockets in which they are mounted.

By my invention, I provide a bearing of the type above described in which the balls are so mounted as to cause both of them to rotate slowly with respect to their supporting members and to cause each of them to rotate in a fixed predetermined manner but about a constantly changing axis, whereby the balls are caused to move so as to continuously present fresh bearing surfaces to the surfaces which they engage until the entire surface of each ball has been used as a bearing surface an equal amount which will prevent flat spots being worn thereon.

Reference may now be had to the accompanying drawings in which I show a shaft or journal 1 mounted in a journal box 2 which, in turn, is mounted in a bearing member 3 of a machine, not shown. The shaft 1 is provided with a conical recess 4 concentrically disposed in the end thereof, and the journal box 2 is provided with a somewhat similar recess 5 disposed slightly out of alinement with the shaft 1. The balls 6 and 7 are so mounted in the recesses 4 and 5, respectively, as to engage with each other. Upon rotation of the shaft 1, the ball 6 tends to rotate therewith but, because of the slight friction exerted by the ball 7, it moves at a slightly slower rate of rotation. The ball 7 will also be rotated slowly within the journal 2 by reason of its engagement with the rotating ball 6. The fact that one of these balls is slightly out of alinement with the axis of rotation of the shaft will cause them both to rotate about constantly changing axes which, at any instant, will be oblique to the axis of the shaft. This action will cause the balls 6 and 7 to continuously present fresh bearing surfaces to each other, to the shaft 4 and the journal box 5, and to travel in a predetermined regular motion until all parts of the surfaces thereof have been used an equal amount in engagement with each of the other bearings, after which they will start again on a similar cycle of operation.

It is not necessary that the balls 6 and 7 be of the same size or that they rotate at the same speed with respect to their sockets but, if two balls are used, as has been found to be preferable, they both should rotate within their sockets about constantly changing axes. The ball 7 must be disposed far enough from the axis of the shaft to insure movement of the balls 6 and 7 as previously described and must not be disposed far enough away to produce a side thrust on the shaft 1.

In the modification shown in Fig. 2, a shaft 8 is provided with a spherically curved end portion 9 which engages a ball 10 mounted in a conical recess 11 in the journal box 12 and slightly out of alinement with the shaft 8. The fact that this ball 10 is slightly out of alinement with the shaft 8 will cause it to be continuously rotated by the shaft about a constantly changing axis so as to produce a motion therein similar to that described in connection with the balls 6 and 7 of Fig. 1.

From the foregoing description, it will be apparent that, since the balls are rotated about constantly changing axes, fresh bearing surfaces will be constantly presented thereby and, for this reason, no flat spots will be worn upon the balls and they will remain perfect spheres during a period of operation of any length whatsoever.

While I have shown but two forms of my invention, it will be understood by those skilled in the art that it is not so limited, but is susceptible of various minor changes and modifications without departing from the spirit thereof, and I desire, therefore, that only such limitations shall be placed thereupon as are imposed by the prior art or are specifically set forth in the appended claims.

I claim as my invention:

1. A thrust bearing comprising a shaft and a stationary bearing surface disposed at the end thereof, a bearing ball rotatably mounted in the end of said shaft, an additional bearing ball disposed intermediate said stationary bearing surface and said rotatably mounted ball and in contact with the latter, and means for causing both of said balls to move so as to continuously present fresh bearing surfaces to the surfaces which they engage.

2. A thrust bearing comprising relatively rotatable members, one of said members presenting a substantially convexly spherically curved surface, a sphere disposed intermediate said members and contacting with said substantially convexly spherically curved surface, and means for maintaining said sphere slightly out of alinement with the axis of rotation of the member having the spherically curved surface and for restricting the circular movement of said sphere about said axis of rotation.

3. A thrust bearing comprising a shaft and a stationary bearing surface disposed at the end thereof, a bearing ball mounted in the end of said shaft, an additional bearing ball disposed between said stationary bearing surface and said first-mentioned bearing ball, and means for causing each point on the surface of both of said balls to move in other than a circular path.

4. A thrust bearing comprising a shaft and a bearing surface disposed at the end thereof, a bearing ball rotatably mounted in the end of said shaft, and a coacting bearing ball rotatably mounted in said bearing surface, one of said balls being so mounted as to cause each ball to rotate about a constantly changing axis.

5. A thrust bearing comprising a shaft and a bearing surface disposed at the end thereof, a bearing ball rotatably mounted in the end of said shaft, and a coacting bearing ball rotatably mounted in said bearing surface, one of said balls being maintained slightly out of alinement with the axis of rotation of said shaft.

6. A thrust bearing comprising a shaft and a recess disposed at the end thereof and offset with respect thereto to provide a bearing seat therefor, a bearing ball rotatably and concentrically mounted in the end of said shaft, and a coacting bearing ball rotatably mounted in said bearing seat and maintained slightly out of alinement with the axis of rotation of said shaft by means of said seat.

7. A thrust bearing for a rotatable member having a recess offset with respect to the axis of rotation of said member to provide a bearing seat, a bearing ball mounted in said rotatable member and a bearing ball mounted in said offset recess contacting with said other bearing ball.

In testimony whereof, I have hereunto subscribed my name this 31st day of Jan. 1919.

CLIFFORD A. M. WEBER.